United States Patent
Sugimoto et al.

(10) Patent No.: US 8,400,508 B2
(45) Date of Patent: Mar. 19, 2013

(54) MONITORING SYSTEM

(75) Inventors: Kenichiro Sugimoto, Kanagawa (JP);
Kentaro Ohkawa, Tokyo (JP);
Takayuki Haraguchi, Kanagawa (JP);
Toshihiro Shimizu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 12/994,938

(22) PCT Filed: Jun. 8, 2009

(86) PCT No.: PCT/JP2009/002582
§ 371 (c)(1),
(2), (4) Date: Nov. 29, 2010

(87) PCT Pub. No.: WO2010/016180
PCT Pub. Date: Feb. 11, 2010

(65) Prior Publication Data
US 2011/0128383 A1    Jun. 2, 2011

(30) Foreign Application Priority Data
Aug. 7, 2008 (JP) ................................ 2008-204089

(51) Int. Cl.
*H04N 7/18* (2006.01)
(52) U.S. Cl. ..................................... 348/159; 348/211.6
(58) Field of Classification Search .................. 348/159, 348/211.6
See application file for complete search history.

(56) References Cited

U.S. PATENT DOCUMENTS

| 5,264,929 A | * | 11/1993 | Yamaguchi | ................... 348/159 |
| 5,867,484 A | | 2/1999 | Shaunfield | |
| 2009/0303328 A1 | | 12/2009 | Miyawaki et al. | |

FOREIGN PATENT DOCUMENTS

| DE | 19909651 | 9/2000 |
| EP | 0493262 | 7/1992 |
| JP | 04-234290 | 8/1992 |
| JP | 2003-250149 | 9/2003 |
| JP | 2006-080716 | 3/2006 |
| JP | 2007-74621 | 3/2007 |

OTHER PUBLICATIONS

Search report from E.P.O., mail date is Jun. 8, 2011.

* cited by examiner

*Primary Examiner* — Sath V Perungavoor
*Assistant Examiner* — Jeffery Williams
(74) *Attorney, Agent, or Firm* — Greenblum & Bernstein, P.L.C.

(57) ABSTRACT

In a monitoring system, a plurality of monitoring devices for performing a sequence operation of sequentially switching images output from a plurality of cameras are connected. Each of the monitoring devices includes: an address information collection unit configured to collect address information of other cascaded monitoring devices when the sequence operation of an own device is started; a storage unit configured to store the address information collected by the address information collection unit; and a command transmission unit configured to determine a next address from the address information stored in the storage unit and to transmit a command for starting the sequence operation to one of the other monitoring devices which has the determined next address when the sequence operation of the own device is terminated.

2 Claims, 10 Drawing Sheets

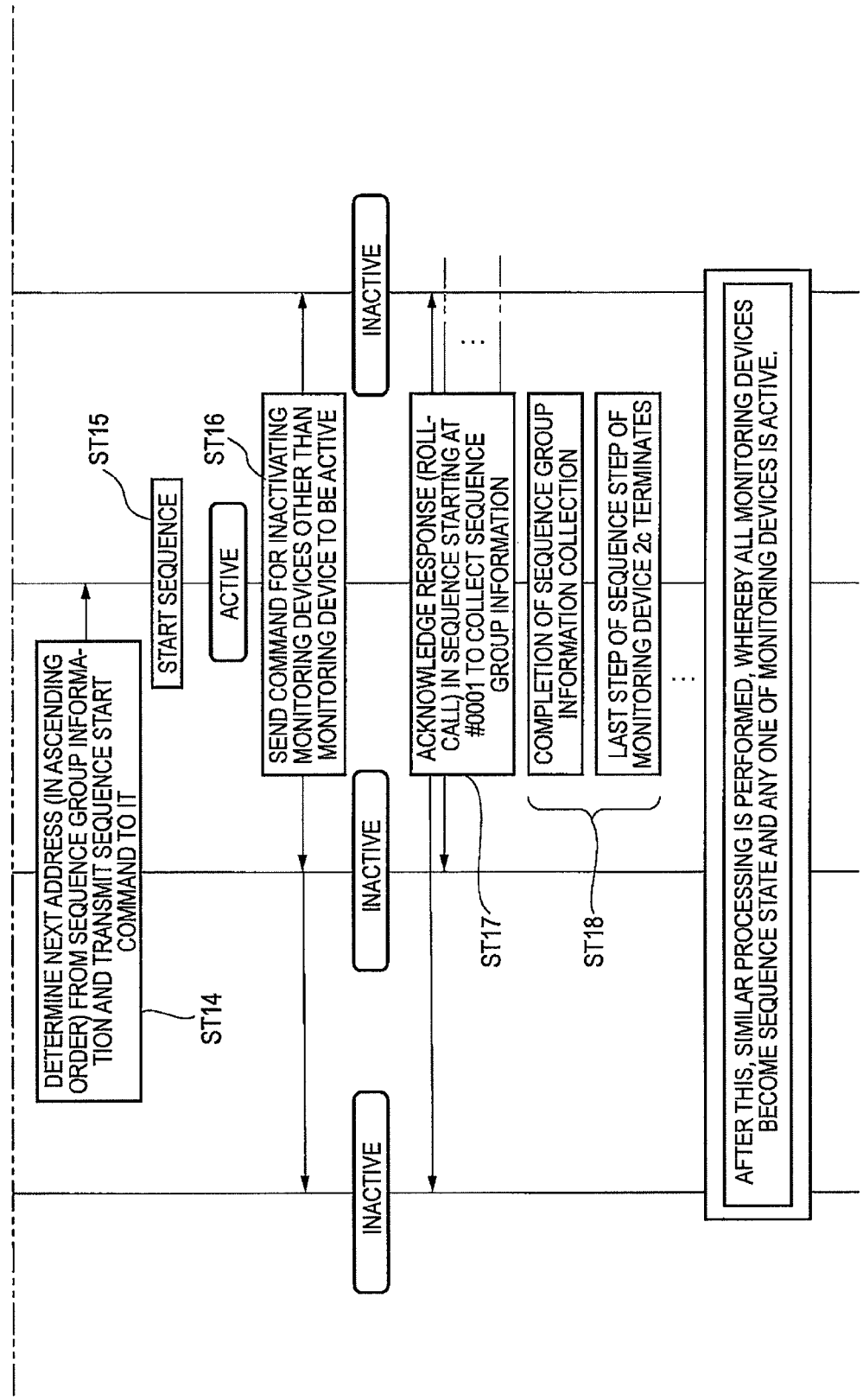

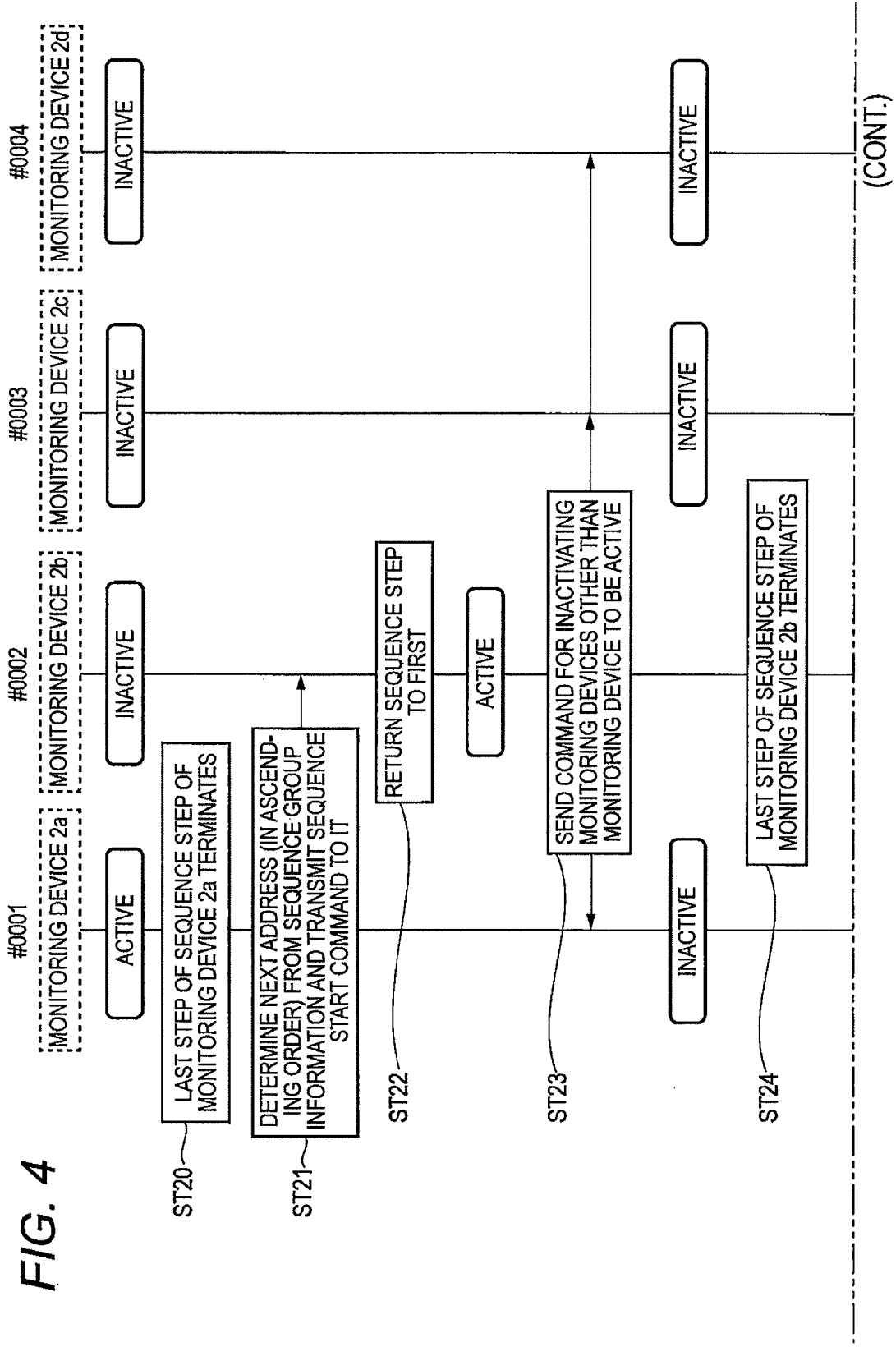

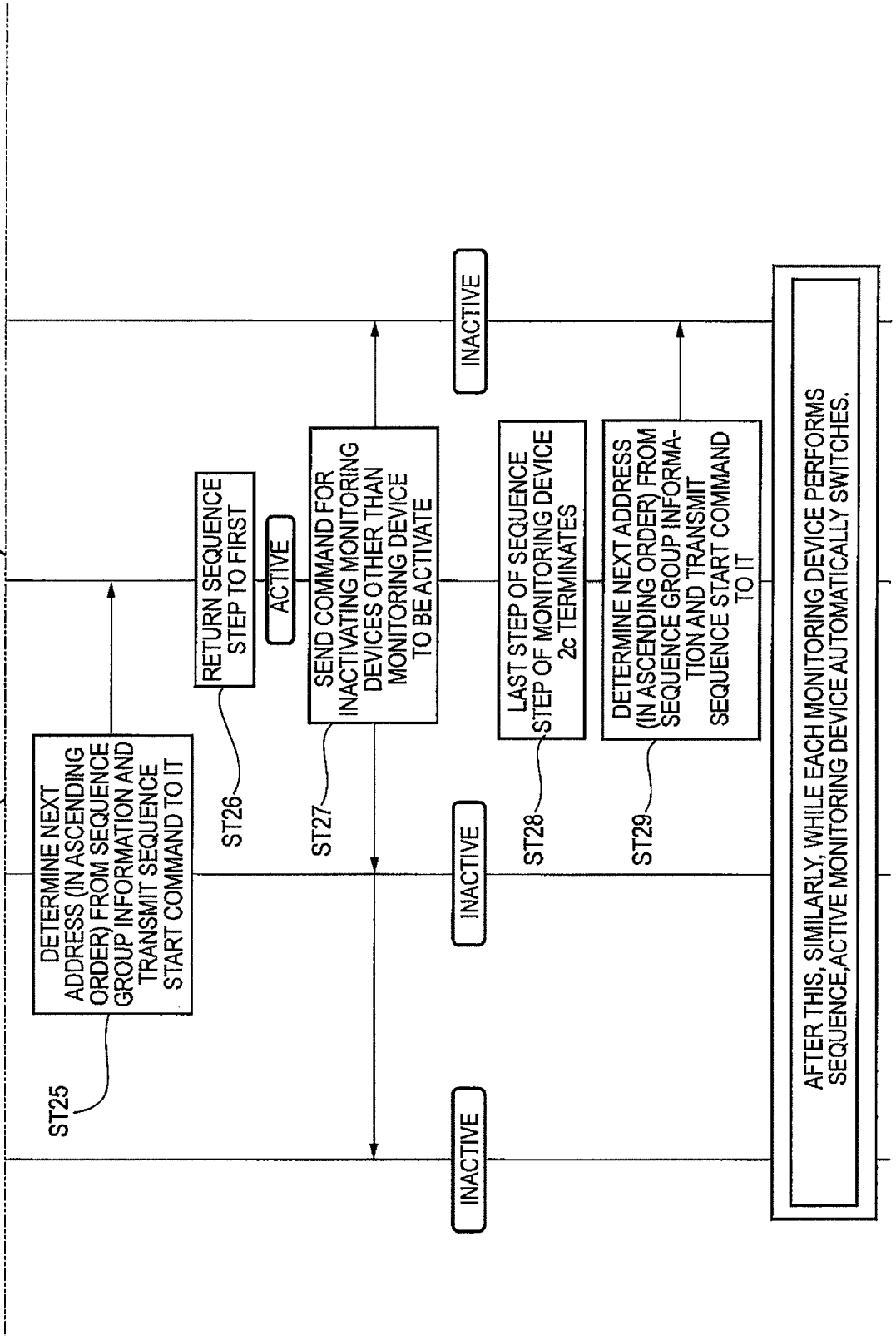

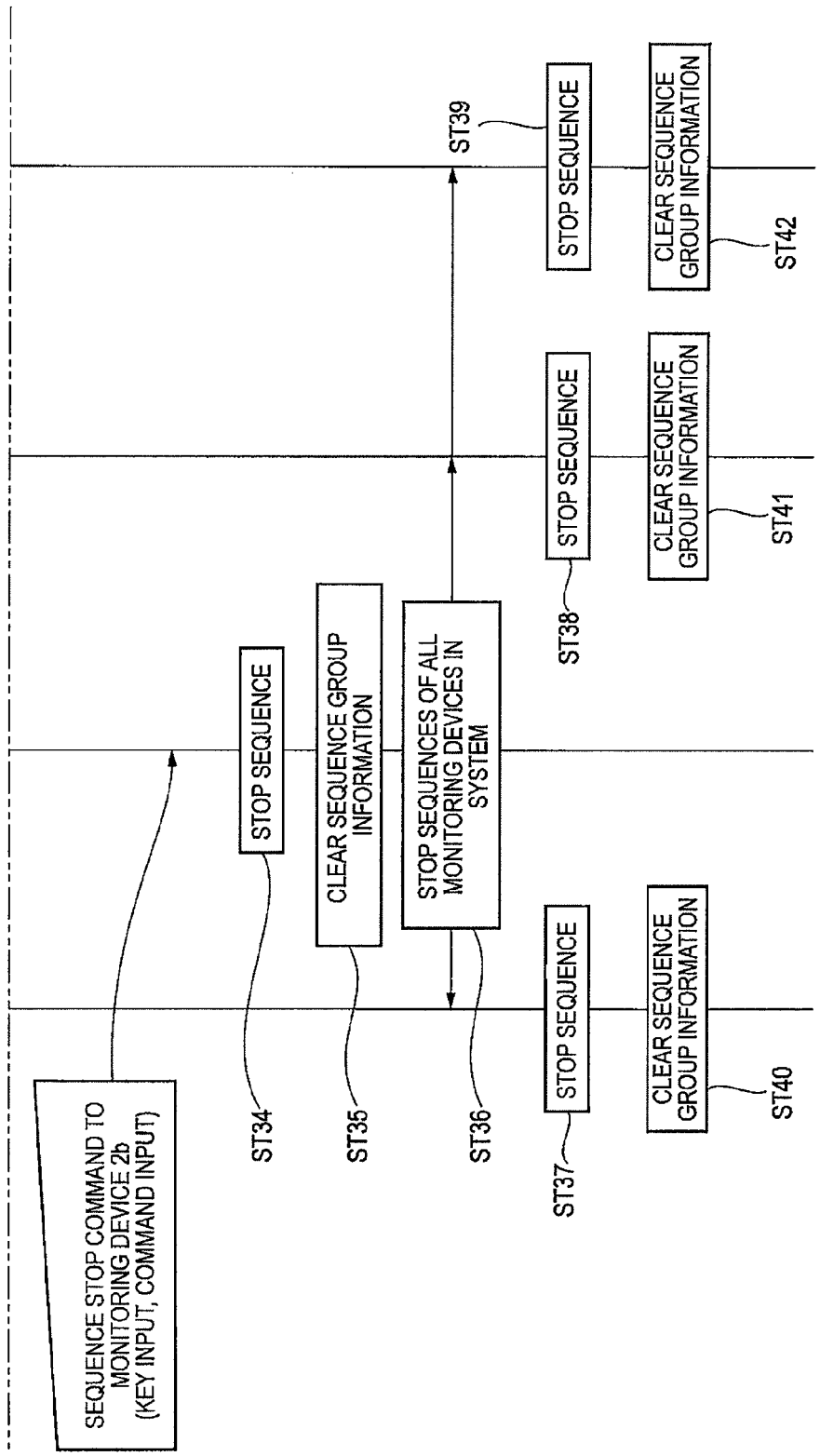

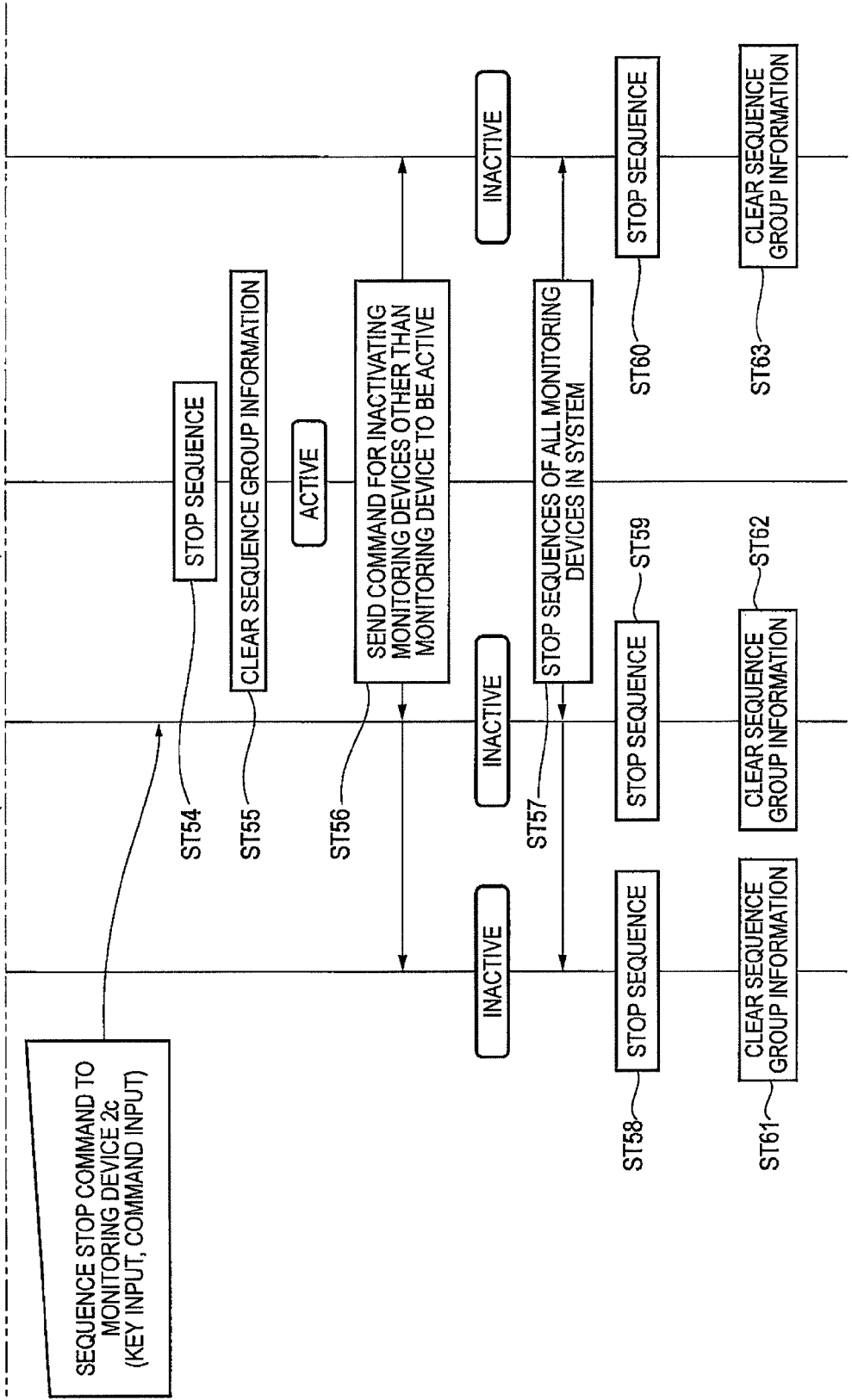
(FIG. 6 Continued)

MONITORING SYSTEM

TECHNICAL FIELD

This invention relates to a monitoring device for performing sequence operation of sequentially switching images output from a plurality of cameras.

BACKGROUND ART

Patent Document 1 discloses a monitoring system in which a plurality of monitoring devices (recorders) are cascaded and are controlled by one controller. The controller has a table concerning the system configuration and sequentially outputs a command to each monitoring device in accordance with the table, thereby realizing the sequence operation in each monitoring device.

PRIOR ART DOCUMENT

Patent Document

Patent Document 1: JP-A-2007-074621

SUMMARY OF THE INVENTION

Problem to be Solved by the Invention

However, in the monitoring system disclosed in Patent Document 1 described above, it is always necessary to provide the controller for causing the sequence operation to be performed in each of the cascaded monitoring devices, and accordingly the cost is increased and a space for installing the controller becomes necessary; this is a problem.

In view of the circumstances described above, an object of the invention is to provide monitoring devices that can realize the sequence operation in each monitoring device without having a controller in cascaded monitoring devices.

Means for Solving the Problem

A monitoring device of the invention is a monitoring device for performing a sequence operation of sequentially switching images output from a plurality of cameras and includes address information collection means for colleting address information of other cascaded monitoring devices, storage means for storing the address information collected by the address information collection means, and command transmission means for determining a next address from the address information stored in the storage means and transmitting a command for starting sequence operation to one of the other monitoring devices which has the determined next address.

According to the configuration, the address information of other cascaded monitoring devices is collected, the next address is determined from the collected address information, and a command for starting the sequence operation is transmitted to one monitoring device having the determined next address, so that the sequence operation in each monitoring device can be realized without having a controller. Since the controller is not included, the cost can be reduced, and the space can be saved.

In the configuration described above, the monitoring device includes image record means for recording the images from the plurality of cameras, whereby the images picked up by the plurality of cameras can be recorded.

Advantages of the Invention

According to the invention, when the monitoring devices for performing the sequence operation of sequentially switching images output from a plurality of cameras are cascaded, the sequence operation in each monitoring device can be realized without having a controller.

BRIEF DESCRIPTION OF THE DRAWINGS

FIG. 4 is a sequence chart to describe the operation of the monitoring system in FIG. 1.

BEST MODE FOR CARRYING OUT THE INVENTION

Figure 1:
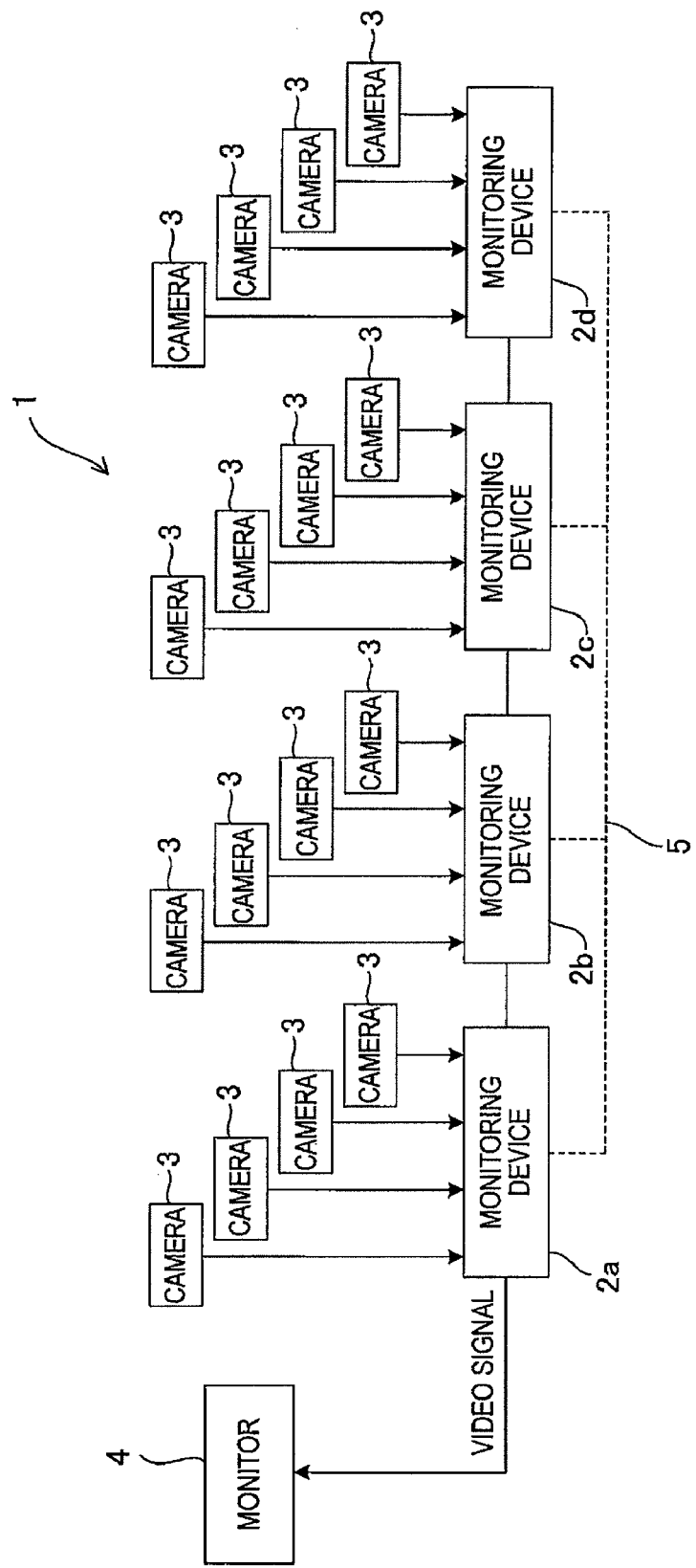
FIG. 1 is a block diagram to show the schematic configuration of a monitoring system according to one embodiment of the invention.

A preferred embodiment for carrying out the invention will be discussed below in detail with reference to the accompanying drawings:

FIG. 1 is a block diagram to show the schematic configuration of a monitoring system according to one embodiment of the invention. In FIG. 1, a monitoring system 1 of the embodiment includes four monitoring devices 2a to 2d, a plurality of cameras 3 connected to each of the monitoring devices 2a to 2d, and a monitor 4 for displaying images picked up by the cameras 3 of the monitoring devices 2a to 2d.

Each of the monitoring devices 2a to 2d has a function of performing the sequence operation of sequentially switching images output from the cameras 3. The monitoring devices 2a to 2d are cascaded, and a control signal communication cable 5 is connected to the monitoring devices 2a to 2d in common. Unique address information is given to each of the monitoring devices 2a to 2d, and when one monitoring device becomes active, the one monitoring device collects address information of other monitoring devices and creates a table. For example, when the monitoring device 2a becomes active, the monitoring device 2a collects the address information of the mentoring devices 2b to 2d and creates a table. Whenever each of the monitoring devices 2a to 2d becomes active, the monitoring devices 2a to 2d becoming active collects address information, whereby even if a monitoring device is added or deleted in the system, flexible measures can be taken. Although described later in detail, the monitoring devices 2a to 2d collect address information in parallel during a sequence, and thus a delay does not occur in sequence start processing or switching processing of a monitoring device which performs the sequence. Each of the monitoring devices 2a to 2d determines its own sequence control and a command to the monitoring device for starting the sequence next by self decision, so that a sequence step responsive to the situation of the monitoring device can be adjusted.

The monitoring system 1 of the embodiment has four monitoring devices 2a to 2d, but the number of monitoring devices is not limited and may be any. The number of cameras 3 connected to each of the monitoring devices 2a to 2d is not limited and may be any.

Each of the monitoring devices 2a to 2d collects and stores the address information of all other monitoring devices (for example, for the monitoring device 2a, the monitoring devices 2b to 2d become other monitoring devices), determines the next address from the stored address information, and transmits a command to start the sequence operation to the monitoring device having the address. Each of the monitoring devices 2a to 2d stops the sequence operation for all other monitoring devices in accordance with an operator command.

Figure 2:
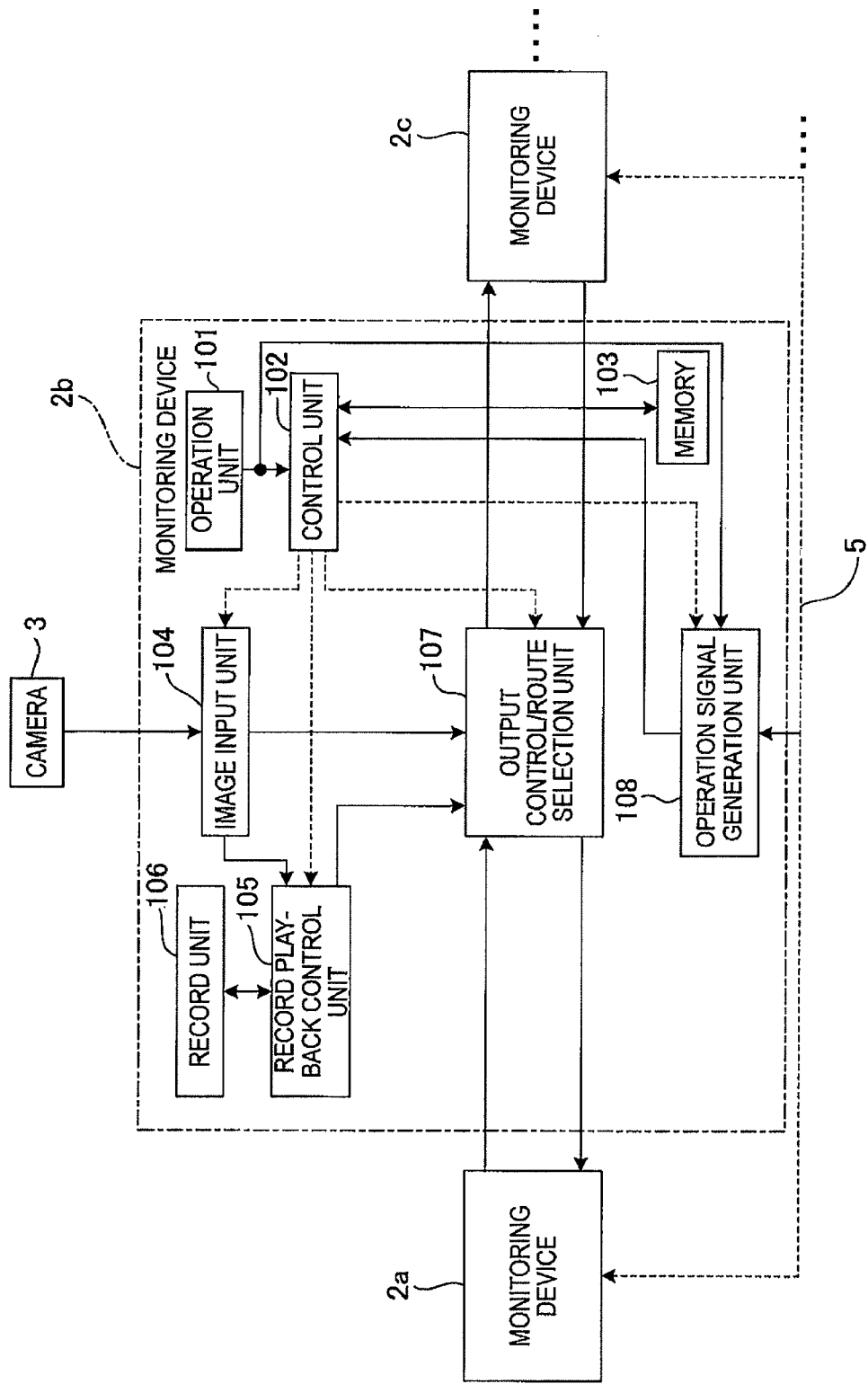
FIG. 2 is a block diagram to show the schematic configuration of a monitoring device in the monitoring system in FIG. 1.

Since the monitoring devices 2a to 2d include the same configuration, the configuration of the monitoring device will be discussed by taking the monitoring device 2b as an example. FIG. 2 is a block diagram to show the schematic configuration of the monitoring device 2b. In FIG. 2, the monitoring device 2b includes an operation unit 101, a control unit 102, memory 103, an image input unit 104, a record playback control unit 105, a record unit 106, an output control/route selection unit 107, and an operation signal generation unit 108. The operation unit 101 is provided for an operator to directly operate the operation of the monitoring device 2b and outputs an operation signal responsive to operation of the operator to the control unit 102 and the operation signal generation unit 108. The control unit 102 controls the units of the device and includes a CPU not shown, ROM storing a program for controlling the CPU, RAM used in the operation of the CPU, and an interface for inputting/outputting a signal. The control unit 102 controls the image input unit 104, the record playback control unit 105, the output control/route selection unit 107, and the operation signal generation unit 108 based on an operation signal input from the operation signal generation unit 108, signals input from the adjacent monitoring devices 2a and 2c, and an operation signal input from the operation unit 101.

When the own monitoring device is activated, the control unit 102 collects the address information of all other monitoring devices 2a, 2c, and 2d, creates a table, and writes the table to the memory 103. Volatile memory of RAM, etc., is mainly used for the memory 103. An image signal from the camera 3 is input to the image input unit 104. The image input unit 104 outputs the image signal input from the camera 3 to the record playback control unit 105. Upon reception of an output command of an image picked up by the camera 3 specified by the control unit 102, the image input unit 104 selects the image picked up by the specified camera 3 and outputs the image to the output control/route selection unit 107. The record playback control unit 105 converts the analog image signal input from the image input unit 104 into a digital signal, codes the signal, and outputs the signal to the record unit 106 together with information of the logical channel number of the camera 3 picking up the input image and the like. The record playback control unit 105 reads the image data recorded in the record unit 106, decodes and converts the digital image data into analog image data and outputs the analog image data as a playback image signal. The recording and the playback operation of the record playback control unit 105 are performed based on a command of the control unit 102.

The record unit 106 is storage of a hard disk, etc., for example, and records the image data output from the record playback control unit 105, information of the camera 3 relating to the image data, and the like. The output control/route selection unit 107 selects at least one of an image signal from the image input unit 104, a playback image signal from the record playback control unit 105, and a video signal input from the adjacent monitoring device 2a or 2c based on a command from the control unit 102 and outputs the selected signal to the adjacent monitoring device 2a or 2c. The operation signal generation unit 108 generates an operation signal based on a control signal input from the monitoring device 2a, the monitoring device 2c, the monitoring device 2d and outputs the operation signal to the control unit 102.

The control unit 102 corresponds to address information collection means. The memory 103 corresponds to storage means. The control unit 102 and the operation signal generation unit 108 corresponds to command transmission means. The record unit corresponds to image record means.

Figure 3:
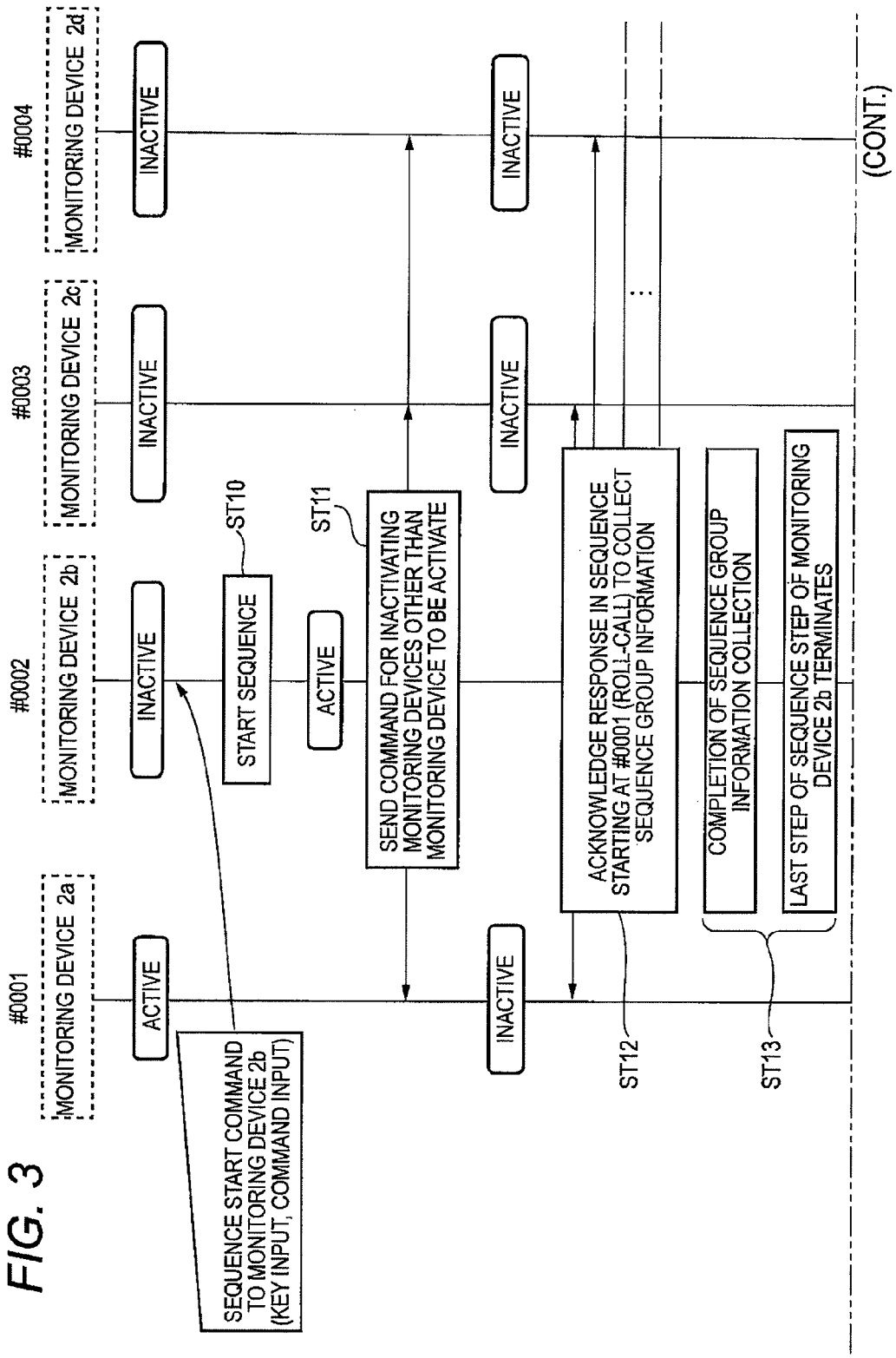
FIG. 3 is a sequence chart to describe the operation of the monitoring system in FIG. 1.

Next, the operation of the monitoring system 1 of the embodiment will be discussed. FIG. 3 is a sequence chart to show the operation of each of the monitoring devices 2a to 2d when the monitoring system 1 of the embodiment is first used and an operator gives a sequence start command to the monitoring device 2b. It is assumed that addresses #0001, #0002, #0003, and #0004 are given to the monitoring devices 2a to 2d.

In FIG. 3, the operator gives a sequence start command to the monitoring device 2b by key input or command input using the operation unit 101 of the monitoring device 2b. When the sequence start command is given, the monitoring device 2b starts a sequence (step ST10) and becomes active. Here, active refers to a state of output from the monitoring device to the monitor 4 (namely, display of an image on the monitor 4). When the monitoring device 2b becomes active, the monitoring device 2b transmits a command for making all other monitoring devices than the own device inactive (step ST11). The command is transmitted, whereby the monitoring devices 2a, 2c, and 2d other than the monitoring device 2b become inactive. Since the monitoring system 1 of the embodiment is made up of the four monitoring devices 2a to 2d, the command for making the monitoring devices inactive is transmitted, whereby the monitoring devices 2a, 2c, and 2d become inactive.

Next, to collect sequence group information, the monitoring device 2b acknowledges a response in sequence from the monitoring device 2a of #0001 to the monitoring device 2d of #0004 (step ST12). That is, the roll is called. The sequence group information is collected, whereby all monitoring devices making up the monitoring system 1 cab be kept track of. The monitoring device 2b performs sequence group information collection processing only at the sequence start time, and holds the collected sequence group information until the sequence is stopped. The sequence group information is stored in the memory 103 in a table format. After the sequence group information is collected, when the last step in the sequence step terminates (step ST13), the next address is determined from the sequence group information and a sequence start command is transmitted to the monitoring device of the address (step ST14). Here, the next address is determined in the ascending order and the sequence start command is transmitted to the monitoring device 2c. Although the address of the monitoring device 2c is not the maximum, if it is assumed the maximum, again the monitoring device having the minimum address value is made the sequence target device. In the embodiment, the address of the monitoring device 2d is the maximum. If the monitoring device 2b transmits the sequence start command to other monitoring devices, the sequence of the own device remains continued.

When the monitoring device 2c is given the sequence start command, the monitoring device 2c starts a sequence (step ST15) and becomes active. The monitoring device 2c transmits a command for making all other monitoring devices than the monitoring device 2*c* inactive (step ST16). The command is transmitted, whereby all monitoring devices 2*a*, 2*b*, and 2*d* other than the monitoring device 2*c* become inactive. Next, to collect sequence group information, the monitoring device 2*c* acknowledges a response in sequence from the monitoring device 2*a* of #0001 to the monitoring device 2*d* of #0004 (step ST17). After the sequence group information is collected, when the last step in the sequence step of the monitoring device 2*c* terminates (step ST18), the monitoring device 2*c* determines the next address from the sequence group information and transmits a sequence start command to the monitoring device of the address. After this, similar processing to that described above is performed, all monitoring devices 2*a* to 2*d* become a sequence state and any one of the monitoring devices is active.

FIG. 4 is a sequence chart to show the operation of each monitoring device after one cycle of the sequence operation. The sequence group information is held in each of the monitoring devices 2*a* to 2*d* by one cycle of the sequence operation and thus processing of acquiring the sequence group information is not again performed. A sequence start command given by the operator becomes unnecessary.

In FIG. 4, when the last step in the sequence step of the monitoring device 2*a* terminates (ST20), the monitoring device 2*a* determines the next address from the sequence group information and transmits a sequence start command to the monitoring device 2*b* of the address (step ST21). The monitoring device 2*b* determines completion of one cycle and returns the sequence step to the first (step ST22). In this case, the sequence is already activated and thus the step needs only to be returned to the first. After the monitoring device 2*b* returns the sequence step to the first, the monitoring device 2*b* becomes active. Next, the monitoring device 2*b* transmits a command for making all monitoring devices other than the own device inactive (step ST23). The command is transmitted, whereby the monitoring devices 2*a*, 2*c*, and 2*d* other than the monitoring device 2*b* become inactive.

Then, when the last step terminates in the sequence step (step ST24), the monitoring device 2*b* determines the next address from the sequence group information and transmits a sequence start command to the monitoring device 2*c* of the address (step ST25). In this case, already acquired sequence group information is used. Upon reception of the sequence start command, the monitoring device 2*c* returns the sequence step to the first (step ST26) and becomes active. The monitoring device 2*c* transmits a command for making all monitoring devices other than the own device inactive (step ST27). The command is transmitted, whereby the monitoring devices 2*a*, 2*b*, and 2*d* other than the monitoring device 2*c* become inactive.

Then, when the last step terminates in the sequence step (step ST28), the monitoring device 2*c* determines the next address from the sequence group information and transmits a sequence start command to the monitoring device 2*d* of the address (step ST29). In this case, already acquired sequence group information is used. After this, similar processing to that described above is performed and while each of the monitoring devices 2*a* to 2*d* performs the sequence operation, the active monitoring device automatically switches.

Figure 5:
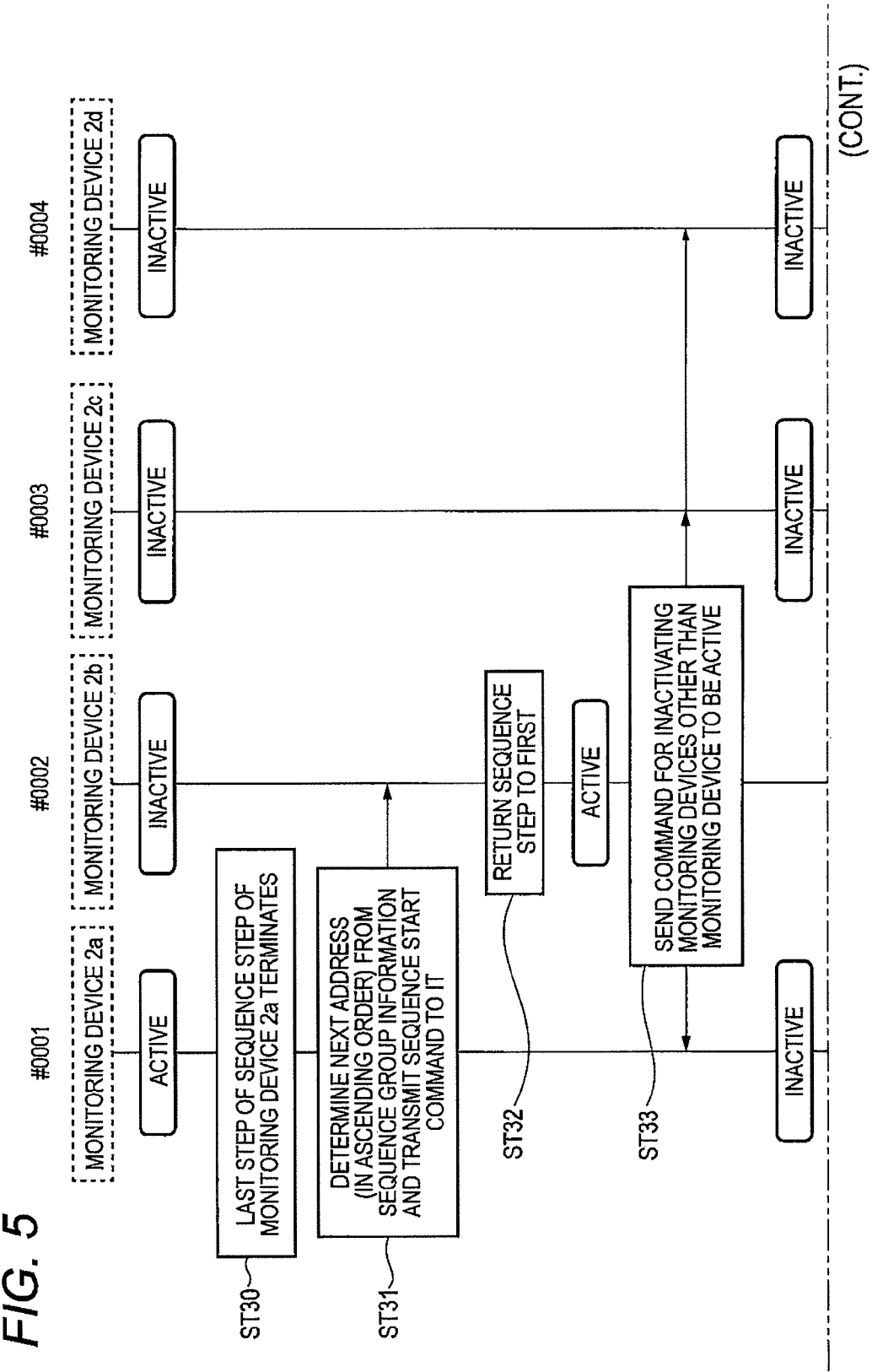
FIG. 5 is a sequence chart to describe the operation of the monitoring system in FIG. 1.

FIG. 5 is a sequence chart to show the operation of each monitoring device when the operator performs stop operation for the active monitoring device. In FIG. 5, the active monitoring device switches from the monitoring device 2*a* to the monitoring device 2*b* and the monitoring device 2*b* transmits a command for making all monitoring devices 2*a*, 2*c*, and 2*d* other than the own device inactive. After the monitoring devices 2*a*, 2*c*, and 2*d* become inactive (steps ST30 to ST33), the operator performs key input and command input using the operation unit 101 of the monitoring device 2*b* and gives a sequence stop command to the active monitoring device 2*b*. Accordingly, the monitoring device 2*b* stops the sequence (step ST34). Then, the monitoring device 2*b* clears the sequence group information (step ST35). The monitoring device 2*b* stops sequences of all other monitoring devices 2*a*, 2*c*, and 2*d* (step ST36). Accordingly, the monitoring devices 2*a*, 2*c*, and 2*d* stop their respective sequences (steps ST37 to ST39) and further clear the sequence group information (steps ST40 to ST42). Thus, stop operation is performed for the active monitoring device 2*b*, whereby the sequences of other monitoring devices 2*a*, 2*c*, and 2*d* can be stopped.

Figure 6:
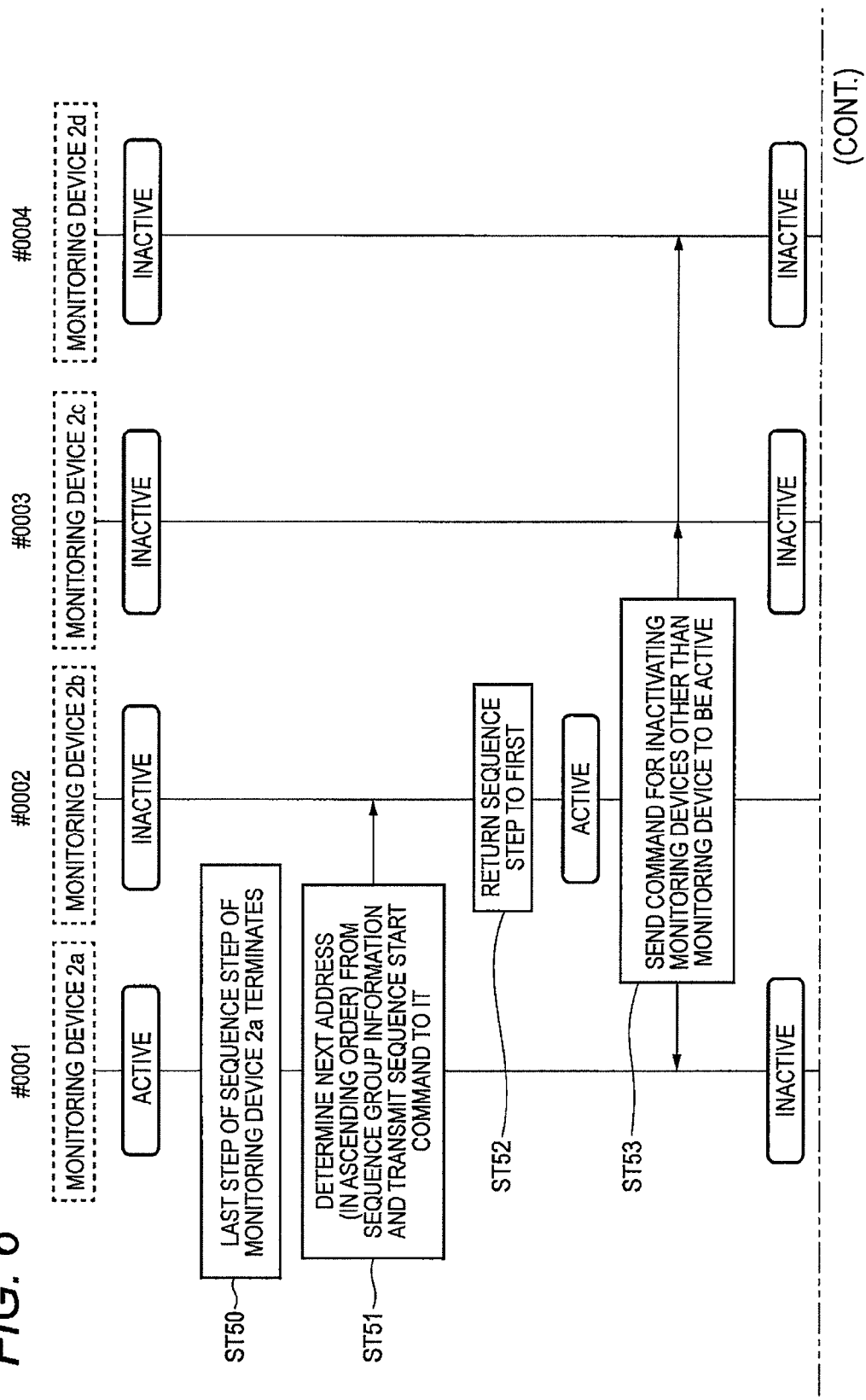
FIG. 6 is a sequence chart to describe the operation of the monitoring system in FIG. 1.

FIG. 6 is a sequence chart to show the operation of each monitoring device when the operator performs stop operation for an inactive monitoring device. In FIG. 6, from the monitoring device 2*a* which is active, the state transitions to the monitoring device 2*b*, and the monitoring device 2*b* transmits a command for making all monitoring devices other than the own device inactive. After the monitoring devices 2*a*, 2*c*, and 2*d* other than the monitoring device 2*b* become inactive (steps ST50 to ST53), the operator gives a sequence stop command to the inactive monitoring device 2*c* by key input or command input using the operation unit 101 of the monitoring device 2*c*. Accordingly, the monitoring device 2*c* stops the sequence (step ST54). Then, the monitoring device 2*c* clears the sequence group information (step ST55). The monitoring device 2*c* becomes active and transmits a command for making all monitoring devices 2*a*, 2*b*, and 2*d* other than the own device inactive (step ST56). The command is transmitted, whereby the monitoring devices 2*a*, 2*b*, and 2*d* other than the monitoring device 2*c* become inactive. Then, the monitoring device 2*c* stops the sequences of all other monitoring devices 2*a*, 2*b*, and 2*d* (step ST57). Accordingly, the monitoring devices 2*a*, 2*b*, and 2*d* stop their respective sequences (steps ST58 to ST60) and further clear the sequence group information (steps ST61 to ST63). Thus, if stop operation is performed for the inactive monitoring device 2*c*, the sequences of other monitoring devices 2*a*, 2*b*, and 2*d* can be stopped.

As described above, according to the monitoring system 1 of the embodiment, each of the cascaded monitoring devices 2*a* to 2*d* collects the address information of any other monitoring device, stores the address information in the memory 103, determines the next address from the address information stored in the memory 103, and a command for starting the sequence operation is transmitted to one monitoring device having the determined next address, so that each of the monitoring devices 2*a* to 2*d* can be caused to perform the sequence operation without having a controller. Since a controller is not included, the cost can be reduced and the space can be saved.

Each of the monitoring devices 2*a* to 2*d* has the record unit 106 for recording images output from the cameras 3 and can record the images picked up by the cameras.

While the invention has been described in detail with reference to the specific embodiments, it will be obvious to those skilled in the art that various changes and modifications can be made without departing from the spirit and the scope of the invention.

This application is based on Japanese Patent Application (No. 2008-204089) filed on Aug. 7, 2008, which is incorporated herein by reference.

INDUSTRIAL APPLICABILITY

The invention has the advantage that when the monitoring devices for performing the sequence operation of sequentially switching the images output from a plurality of cameras are cascaded, the sequence operation in each monitoring device can be realized without having a controller, and can be applied to a monitoring system having a plurality of monitoring device cascaded.

DESCRIPTION OF REFERENCE SIGNS

1 Monitoring system
2a-2d Monitoring device
3 Camera
4 Monitor
5 Control signal communication cable
101 Operation unit
102 Control unit
103 Memory
104 Image input unit
105 Record playback control unit
106 Record unit
107 Output control/route selection unit
108 Operation signal generation unit

The invention claimed is:

1. A monitoring system in which a plurality of monitoring devices for performing a sequence operation of sequentially switching images output from a plurality of cameras are connected, wherein each of the monitoring devices comprises:

an address information collection unit configured to collect address information of other cascaded monitoring devices when the sequence operation of an own device is started;

a storage unit configured to store the address information collected by the address information collection unit; and a command transmission unit configured to determine a next address from the address information stored in the storage unit and to transmit a command for starting the sequence operation to one of the other monitoring devices which has the determined next address when the sequence operation of the own device is terminated.

2. The monitoring system according to claim 1, wherein the command transmission unit of each of the monitoring devices transmits a command for terminating the sequence operation to all of the other cascaded monitoring devices when the sequence operation is stopped.

* * * * *